(12) United States Patent
Farrelly (10) Patent No.: US 8,903,843 B2
(45) Date of Patent: Dec. 2, 2014

(54) HISTORICAL MEDIA RECOMMENDATION SERVICE

(75) Inventor: Eugene M. Farrelly, Cary, NC (US)

(73) Assignee: Napo Enterprises, LLC, Wilmington, DE (US)

( * ) Notice: Subject to any disclaimer, the term of this patent is extended or adjusted under 35 U.S.C. 154(b) by 1559 days.

(21) Appl. No.: 11/471,797

(22) Filed: Jun. 21, 2006

(65) Prior Publication Data

US 2009/0077052 A1    Mar. 19, 2009

(51) Int. Cl.
*G06F 17/30* (2006.01)

(52) U.S. Cl.
CPC .................. *G06F 17/30026* (2013.01)
USPC ........... 707/767; 707/750; 707/751; 707/758; 707/768; 707/776

(58) Field of Classification Search
CPC .................. G06F 17/30; G06F 17/00
See application file for complete search history.

(56) References Cited

U.S. PATENT DOCUMENTS

| | | | |
|---|---|---|---|
| 4,870,579 A | 9/1989 | Hey | |
| 5,621,456 A | 4/1997 | Florin et al. | |
| 5,771,778 A | 6/1998 | MacLean, IV | |
| 5,956,027 A | 9/1999 | Krishnamurthy | |
| 5,963,916 A | 10/1999 | Kaplan | |
| 6,134,552 A | 10/2000 | Fritz et al. | |
| 6,195,657 B1 | 2/2001 | Rucker et al. | |
| 6,266,649 B1 | 7/2001 | Linden et al. | |
| 6,314,420 B1 | 11/2001 | Lang et al. | |
| 6,317,722 B1 | 11/2001 | Jacobi et al. | |
| 6,353,823 B1 | 3/2002 | Kumar | |
| 6,388,714 B1 | 5/2002 | Schein et al. | |
| 6,438,579 B1 | 8/2002 | Hosken | |
| 6,498,955 B1 | 12/2002 | McCarthy et al. | |
| 6,526,411 B1 | 2/2003 | Ward | |
| 6,567,797 B1 | 5/2003 | Schuetze et al. | |
| 6,587,127 B1 * | 7/2003 | Leeke et al. | 715/765 |
| 6,587,850 B2 | 7/2003 | Zhai | |
| 6,615,208 B1 | 9/2003 | Behrens et al. | |
| 6,629,104 B1 | 9/2003 | Parulski et al. | |
| 6,636,836 B1 | 10/2003 | Pyo | |
| 6,654,786 B1 | 11/2003 | Fox et al. | |
| 6,662,231 B1 | 12/2003 | Drosset et al. | |
| 6,670,537 B2 | 12/2003 | Hughes et al. | |
| 6,694,482 B1 | 2/2004 | Arellano et al. | |
| 6,757,517 B2 | 6/2004 | Chang | |

(Continued)

FOREIGN PATENT DOCUMENTS

| | | |
|---|---|---|
| CN | 1208930 A | 2/1999 |
| EP | 0898278 A2 | 2/1999 |

(Continued)

OTHER PUBLICATIONS

Cohen, William, et al., "Web-collaborative filtering: recommending music by crawling the Web," Jun. 2000, Computer Networks, pp. 685-698.*

(Continued)

*Primary Examiner* — Farhan Syed (57) ABSTRACT

A media recommendation system for recommending media content that is historically related to seed media content is provided. The recommended media content may be songs, television programs, movies, or a combination thereof, and the seed media content may be a song, television program, or movie.

36 Claims, 3 Drawing Sheets

(56) References Cited

U.S. PATENT DOCUMENTS

| | | | |
|---|---|---|---|
| 6,757,691 B1 | 6/2004 | Welsh et al. | |
| 6,801,909 B2 | 10/2004 | Delgado et al. | |
| 6,865,565 B2 | 3/2005 | Rainsberger et al. | |
| 6,904,264 B1 | 6/2005 | Frantz | |
| 6,912,528 B2 | 6/2005 | Homer | |
| 6,941,275 B1 | 9/2005 | Swierczek | |
| 6,941,324 B2 | 9/2005 | Plastina et al. | |
| 6,947,922 B1 | 9/2005 | Glance | |
| 6,976,228 B2 | 12/2005 | Bernhardson | |
| 6,987,221 B2 | 1/2006 | Platt | |
| 6,990,453 B2 | 1/2006 | Wang et al. | |
| 7,013,301 B2 | 3/2006 | Holm et al. | |
| 7,035,871 B2 | 4/2006 | Hunt et al. | |
| 7,072,846 B1 | 7/2006 | Robinson | |
| 7,072,886 B2 | 7/2006 | Salmenkaita et al. | |
| 7,075,000 B2 | 7/2006 | Gang et al. | |
| 7,082,434 B2 * | 7/2006 | Gosselin | 1/1 |
| 7,089,248 B1 | 8/2006 | King et al. | |
| 7,096,234 B2 | 8/2006 | Plastina et al. | |
| 7,120,619 B2 * | 10/2006 | Drucker et al. | 706/45 |
| 7,139,757 B1 | 11/2006 | Apollonsky et al. | |
| 7,177,872 B2 | 2/2007 | Schwesig et al. | |
| 7,222,187 B2 | 5/2007 | Yeager et al. | |
| 7,283,992 B2 | 10/2007 | Liu et al. | |
| 7,296,032 B1 | 11/2007 | Beddow | |
| 7,340,481 B1 | 3/2008 | Baer et al. | |
| 7,437,364 B1 | 10/2008 | Fredricksen et al. | |
| 7,463,890 B2 | 12/2008 | Herz et al. | |
| 7,496,623 B2 | 2/2009 | Szeto et al. | |
| 7,509,291 B2 | 3/2009 | McBride et al. | |
| 7,533,091 B2 * | 5/2009 | Plastina et al. | 705/26.1 |
| 7,548,915 B2 | 6/2009 | Ramer et al. | |
| 7,590,546 B2 | 9/2009 | Chuang | |
| 7,594,246 B1 | 9/2009 | Billmaier et al. | |
| 7,614,006 B2 | 11/2009 | Molander | |
| 7,676,753 B2 | 3/2010 | Bedingfield | |
| 7,720,871 B2 | 5/2010 | Rogers et al. | |
| 7,805,129 B1 | 9/2010 | Issa et al. | |
| 7,962,482 B2 * | 6/2011 | Handman et al. | 707/733 |
| 8,160,495 B2 * | 4/2012 | Khedouri et al. | 455/41.2 |
| 8,285,595 B2 * | 10/2012 | Svendsen | 705/26.1 |
| 8,452,855 B2 * | 5/2013 | Higgins et al. | 709/219 |
| 2001/0013009 A1 | 8/2001 | Greening et al. | |
| 2001/0021914 A1 | 9/2001 | Jacobi et al. | |
| 2002/0052207 A1 | 5/2002 | Hunzinger | |
| 2002/0052873 A1 | 5/2002 | Delgado et al. | |
| 2002/0082901 A1 | 6/2002 | Dunning et al. | |
| 2002/0087382 A1 | 7/2002 | Tiburcio | |
| 2002/0103796 A1 | 8/2002 | Hartley | |
| 2002/0108112 A1 | 8/2002 | Wallace et al. | |
| 2002/0116533 A1 | 8/2002 | Holliman et al. | |
| 2002/0138836 A1 | 9/2002 | Zimmerman | |
| 2002/0165793 A1 | 11/2002 | Brand et al. | |
| 2002/0178057 A1 | 11/2002 | Bertram et al. | |
| 2002/0194619 A1 * | 12/2002 | Chang et al. | 725/134 |
| 2003/0001907 A1 | 1/2003 | Bergsten et al. | |
| 2003/0005074 A1 | 1/2003 | Herz et al. | |
| 2003/0014407 A1 | 1/2003 | Blatter et al. | |
| 2003/0018799 A1 | 1/2003 | Eyal | |
| 2003/0046399 A1 * | 3/2003 | Boulter et al. | 709/228 |
| 2003/0055516 A1 | 3/2003 | Gang et al. | |
| 2003/0055657 A1 | 3/2003 | Yoshida et al. | |
| 2003/0066068 A1 | 4/2003 | Gutta et al. | |
| 2003/0069806 A1 | 4/2003 | Konomi et al. | |
| 2003/0089218 A1 | 5/2003 | Gang et al. | |
| 2003/0115167 A1 | 6/2003 | Sharif et al. | |
| 2003/0135513 A1 | 7/2003 | Quinn et al. | |
| 2003/0149581 A1 | 8/2003 | Chaudhri et al. | |
| 2003/0149612 A1 | 8/2003 | Berghofer et al. | |
| 2003/0153338 A1 | 8/2003 | Herz et al. | |
| 2003/0160770 A1 | 8/2003 | Zimmerman | |
| 2003/0191753 A1 | 10/2003 | Hoch | |
| 2003/0229537 A1 | 12/2003 | Dunning et al. | |
| 2003/0233929 A1 * | 12/2003 | Agnihotri | 84/609 |
| 2003/0237093 A1 | 12/2003 | Marsh | |
| 2004/0003392 A1 | 1/2004 | Trajkovic et al. | |
| 2004/0034441 A1 | 2/2004 | Eaton et al. | |
| 2004/0073919 A1 | 4/2004 | Gutta | |
| 2004/0088271 A1 | 5/2004 | Cleckler | |
| 2004/0091235 A1 | 5/2004 | Gutta | |
| 2004/0107821 A1 | 6/2004 | Alcalde et al. | |
| 2004/0128286 A1 | 7/2004 | Yasushi et al. | |
| 2004/0133657 A1 | 7/2004 | Smith et al. | |
| 2004/0133908 A1 | 7/2004 | Smith et al. | |
| 2004/0133914 A1 | 7/2004 | Smith et al. | |
| 2004/0162783 A1 | 8/2004 | Gross | |
| 2004/0162830 A1 | 8/2004 | Shirwadkar et al. | |
| 2004/0181540 A1 | 9/2004 | Jung et al. | |
| 2004/0186733 A1 | 9/2004 | Loomis et al. | |
| 2004/0199527 A1 | 10/2004 | Morain et al. | |
| 2004/0215657 A1 * | 10/2004 | Drucker et al. | 707/104.1 |
| 2004/0215793 A1 | 10/2004 | Ryan et al. | |
| 2004/0216108 A1 | 10/2004 | Robbin | |
| 2004/0224638 A1 | 11/2004 | Fadell et al. | |
| 2004/0252604 A1 | 12/2004 | Johnson et al. | |
| 2004/0254911 A1 | 12/2004 | Grasso et al. | |
| 2004/0267604 A1 | 12/2004 | Gross | |
| 2005/0021420 A1 | 1/2005 | Michelitsch et al. | |
| 2005/0021678 A1 | 1/2005 | Simyon et al. | |
| 2005/0026559 A1 | 2/2005 | Khedouri | |
| 2005/0038819 A1 * | 2/2005 | Hicken et al. | 707/104.1 |
| 2005/0038876 A1 | 2/2005 | Chaudhuri | |
| 2005/0060264 A1 | 3/2005 | Schrock et al. | |
| 2005/0060666 A1 | 3/2005 | Hoshino et al. | |
| 2005/0065976 A1 | 3/2005 | Holm et al. | |
| 2005/0091107 A1 | 4/2005 | Blum | |
| 2005/0120053 A1 | 6/2005 | Watson | |
| 2005/0125222 A1 | 6/2005 | Brown et al. | |
| 2005/0131866 A1 | 6/2005 | Badros | |
| 2005/0154608 A1 | 7/2005 | Paulson et al. | |
| 2005/0154764 A1 | 7/2005 | Riegler et al. | |
| 2005/0154767 A1 | 7/2005 | Sako | |
| 2005/0158028 A1 | 7/2005 | Koba | |
| 2005/0166245 A1 | 7/2005 | Shin et al. | |
| 2005/0197961 A1 | 9/2005 | Miller et al. | |
| 2005/0228830 A1 | 10/2005 | Plastina et al. | |
| 2005/0246391 A1 | 11/2005 | Gross | |
| 2005/0251455 A1 | 11/2005 | Boesen | |
| 2005/0251807 A1 | 11/2005 | Weel | |
| 2005/0256756 A1 | 11/2005 | Lam et al. | |
| 2005/0256866 A1 | 11/2005 | Lu et al. | |
| 2005/0267944 A1 | 12/2005 | Little, II | |
| 2005/0278377 A1 * | 12/2005 | Mirrashidi et al. | 707/104.1 |
| 2005/0278758 A1 | 12/2005 | Bodlaender | |
| 2005/0286546 A1 | 12/2005 | Bassoli et al. | |
| 2006/0004640 A1 | 1/2006 | Swierczek | |
| 2006/0004704 A1 | 1/2006 | Gross | |
| 2006/0008256 A1 | 1/2006 | Khedouri et al. | |
| 2006/0010167 A1 | 1/2006 | Grace et al. | |
| 2006/0015378 A1 | 1/2006 | Mirrashidi et al. | |
| 2006/0020662 A1 | 1/2006 | Robinson | |
| 2006/0026048 A1 | 2/2006 | Kolawa et al. | |
| 2006/0048059 A1 | 3/2006 | Etkin | |
| 2006/0064716 A1 | 3/2006 | Sull et al. | |
| 2006/0074750 A1 | 4/2006 | Clark et al. | |
| 2006/0083119 A1 | 4/2006 | Hayes | |
| 2006/0085383 A1 | 4/2006 | Mantle et al. | |
| 2006/0100924 A1 | 5/2006 | Tevanian, Jr. | |
| 2006/0126135 A1 | 6/2006 | Stevens et al. | |
| 2006/0130120 A1 | 6/2006 | Brandyberry et al. | |
| 2006/0143236 A1 | 6/2006 | Wu | |
| 2006/0156242 A1 | 7/2006 | Bedingfield | |
| 2006/0167991 A1 | 7/2006 | Heikes et al. | |
| 2006/0173910 A1 | 8/2006 | McLaughlin | |
| 2006/0174277 A1 | 8/2006 | Sezan et al. | |
| 2006/0190616 A1 | 8/2006 | Mayerhofer et al. | |
| 2006/0195479 A1 | 8/2006 | Spiegelman et al. | |
| 2006/0195512 A1 * | 8/2006 | Rogers et al. | 709/203 |
| 2006/0195514 A1 | 8/2006 | Rogers et al. | |
| 2006/0195515 A1 | 8/2006 | Beaupre et al. | |
| 2006/0195516 A1 | 8/2006 | Beaupre | |
| 2006/0195521 A1 | 8/2006 | New et al. | |
| 2006/0195789 A1 | 8/2006 | Rogers et al. | |
| 2006/0195790 A1 | 8/2006 | Beaupre et al. | |

(56) References Cited

U.S. PATENT DOCUMENTS

| | | |
|---|---|---|
| 2006/0200435 A1 | 9/2006 | Flinn et al. |
| 2006/0206582 A1 | 9/2006 | Finn |
| 2006/0212442 A1* | 9/2006 | Conrad et al. ............... 707/5 |
| 2006/0212444 A1* | 9/2006 | Handman et al. ............... 707/5 |
| 2006/0218187 A1* | 9/2006 | Plastina et al. ............ 707/104.1 |
| 2006/0227673 A1 | 10/2006 | Yamashita et al. |
| 2006/0230065 A1* | 10/2006 | Plastina et al. ............ 707/104.1 |
| 2006/0242201 A1 | 10/2006 | Cobb et al. |
| 2006/0247980 A1 | 11/2006 | Mirrashidi et al. |
| 2006/0248209 A1* | 11/2006 | Chiu et al. ............... 709/231 |
| 2006/0253417 A1 | 11/2006 | Brownrigg et al. |
| 2006/0259355 A1 | 11/2006 | Farouki et al. |
| 2006/0265409 A1 | 11/2006 | Neumann et al. |
| 2006/0265503 A1 | 11/2006 | Jones et al. |
| 2006/0265637 A1 | 11/2006 | Marriott et al. |
| 2006/0271959 A1 | 11/2006 | Jacoby et al. |
| 2006/0271961 A1 | 11/2006 | Jacoby et al. |
| 2006/0277098 A1 | 12/2006 | Chung et al. |
| 2006/0282304 A1 | 12/2006 | Bedard et al. |
| 2006/0282776 A1 | 12/2006 | Farmer et al. |
| 2006/0282856 A1 | 12/2006 | Errico et al. |
| 2006/0288041 A1 | 12/2006 | Plastina et al. |
| 2006/0293909 A1 | 12/2006 | Miyajima et al. |
| 2007/0005793 A1 | 1/2007 | Miyoshi et al. |
| 2007/0008927 A1 | 1/2007 | Herz et al. |
| 2007/0014536 A1 | 1/2007 | Hellman |
| 2007/0022437 A1 | 1/2007 | Gerken |
| 2007/0028171 A1 | 2/2007 | MacLaurin |
| 2007/0043766 A1 | 2/2007 | Nicholas et al. |
| 2007/0044010 A1 | 2/2007 | Sull et al. |
| 2007/0064626 A1 | 3/2007 | Evans |
| 2007/0078714 A1 | 4/2007 | Ott, IV et al. |
| 2007/0078832 A1 | 4/2007 | Ott, IV et al. |
| 2007/0079352 A1 | 4/2007 | Klein, Jr. |
| 2007/0083471 A1 | 4/2007 | Robbin et al. |
| 2007/0083553 A1* | 4/2007 | Minor ............... 707/104.1 |
| 2007/0094081 A1 | 4/2007 | Yruski et al. |
| 2007/0094082 A1 | 4/2007 | Yruski et al. |
| 2007/0094083 A1 | 4/2007 | Yruski et al. |
| 2007/0094363 A1 | 4/2007 | Yruski et al. |
| 2007/0100904 A1* | 5/2007 | Casey et al. ............... 707/201 |
| 2007/0106672 A1 | 5/2007 | Sighart et al. |
| 2007/0106693 A1* | 5/2007 | Houh et al. ............ 707/104.1 |
| 2007/0118425 A1 | 5/2007 | Yruski et al. |
| 2007/0118657 A1 | 5/2007 | Kreitzer et al. |
| 2007/0118802 A1 | 5/2007 | Gerace et al. |
| 2007/0118853 A1 | 5/2007 | Kreitzer et al. |
| 2007/0118873 A1* | 5/2007 | Houh et al. ............ 725/136 |
| 2007/0130008 A1 | 6/2007 | Brown et al. |
| 2007/0130012 A1 | 6/2007 | Yruski et al. |
| 2007/0152502 A1 | 7/2007 | Kinsey et al. |
| 2007/0162502 A1 | 7/2007 | Thomas et al. |
| 2007/0198485 A1 | 8/2007 | Ramer et al. |
| 2007/0199014 A1 | 8/2007 | Clark et al. |
| 2007/0214182 A1 | 9/2007 | Rosenberg |
| 2007/0214259 A1 | 9/2007 | Ahmed et al. |
| 2007/0220081 A1 | 9/2007 | Hyman |
| 2007/0233736 A1 | 10/2007 | Xiong et al. |
| 2007/0238427 A1 | 10/2007 | Kraft et al. |
| 2007/0239724 A1 | 10/2007 | Ramer et al. |
| 2007/0244880 A1 | 10/2007 | Martin et al. |
| 2007/0245245 A1 | 10/2007 | Blue et al. |
| 2007/0265870 A1 | 11/2007 | Song et al. |
| 2007/0265979 A1* | 11/2007 | Hangartner ............... 705/59 |
| 2007/0269169 A1 | 11/2007 | Stix et al. |
| 2007/0277202 A1 | 11/2007 | Lin et al. |
| 2007/0288546 A1 | 12/2007 | Rosenberg |
| 2007/0299873 A1 | 12/2007 | Jones et al. |
| 2007/0299874 A1 | 12/2007 | Neumann et al. |
| 2007/0299978 A1 | 12/2007 | Neumann et al. |
| 2008/0005179 A1 | 1/2008 | Friedman et al. |
| 2008/0010372 A1 | 1/2008 | Khedouri et al. |
| 2008/0016098 A1 | 1/2008 | Frieden et al. |
| 2008/0016205 A1 | 1/2008 | Svendsen |
| 2008/0032723 A1 | 2/2008 | Rosenberg |
| 2008/0033959 A1 | 2/2008 | Jones |
| 2008/0052371 A1 | 2/2008 | Partovi et al. |
| 2008/0052630 A1 | 2/2008 | Rosenbaum |
| 2008/0091771 A1 | 4/2008 | Allen et al. |
| 2008/0120501 A1 | 5/2008 | Jannink et al. |
| 2008/0133601 A1 | 6/2008 | Cervera et al. |
| 2008/0133763 A1 | 6/2008 | Clark et al. |
| 2008/0134043 A1* | 6/2008 | Georgis et al. ............... 715/733 |
| 2008/0134053 A1 | 6/2008 | Fischer |
| 2008/0141136 A1 | 6/2008 | Ozzie et al. |
| 2008/0147711 A1 | 6/2008 | Spiegelman et al. |
| 2008/0189655 A1 | 8/2008 | Kol |
| 2008/0195664 A1 | 8/2008 | Maharajh et al. |
| 2008/0208823 A1 | 8/2008 | Hicken |
| 2008/0235632 A1 | 9/2008 | Holmes |
| 2008/0244681 A1 | 10/2008 | Gossweiler et al. |
| 2008/0270561 A1 | 10/2008 | Tang et al. |
| 2008/0288588 A1 | 11/2008 | Andam et al. |
| 2008/0306826 A1 | 12/2008 | Kramer et al. |
| 2008/0319833 A1 | 12/2008 | Svendsen |
| 2009/0007198 A1 | 1/2009 | Lavender et al. |
| 2009/0042545 A1 | 2/2009 | Avital et al. |
| 2009/0069911 A1 | 3/2009 | Stefik |
| 2009/0069912 A1 | 3/2009 | Stefik |
| 2009/0070267 A9* | 3/2009 | Hangartner ............... 705/59 |
| 2009/0070350 A1 | 3/2009 | Wang |
| 2009/0077124 A1 | 3/2009 | Spivack et al. |
| 2009/0129671 A1 | 5/2009 | Hu et al. |
| 2010/0031366 A1 | 2/2010 | Knight et al. |
| 2011/0213769 A1* | 9/2011 | Handman et al. ............... 707/722 |
| 2013/0179439 A1* | 7/2013 | Handman et al. ............... 707/723 |

FOREIGN PATENT DOCUMENTS

| | | |
|---|---|---|
| EP | 1536352 A1 | 6/2005 |
| EP | 1835455 A1 | 9/2007 |
| GB | 2372850 A | 3/2001 |
| GB | 2397205 A | 7/2004 |
| JP | 2005-321668 | 5/2004 |
| WO | 01/84353 A3 | 11/2001 |
| WO | 02/21335 A1 | 3/2002 |
| WO | 2004/017178 A2 | 2/2004 |
| WO | 2004/043064 A1 | 5/2004 |
| WO | 2005/026916 A2 | 3/2005 |
| WO | 2005/071571 A1 | 8/2005 |
| WO | 2006075032 A1 | 7/2006 |
| WO | 2006/126135 A2 | 11/2006 |
| WO | 2007092053 A1 | 8/2007 |

OTHER PUBLICATIONS

Kosugi, Naoko, et al., "A Practical Query-by-Humming System for a Large Music Database," Oct. 2000, International Multimedia Conference. Proceedings of the 8th ACM International Conference on Multimedia, pp. 333-342.*

Huang, Yao-Chang, et al., "An Audio Recommendation System Based on Audio Signature Descrption Scheme in MPEG-7 Audio," Aug. 2004, IEEE International Conference on Multimedia and Expo, pp. 639-642.*

Aucouturier, J.J., et al., "Scaling up music playlist generation," Aug. 2002, IEEE International Conference of Multimedia and Expo, pp. 105-108.*

Barrie, Steven, "That Song sounds familiar," Feb. 2, 2006, Los Angeles Times, pp. 1-5.*

"Yahoo! Music," downloaded archival page from www.archive.org for Jun. 20, 2005, pp. 1-14.*

"Billboard.Biz", retireved from www.archive.org, snapshot for May 22, 2006, VNU eMedia, Inc. p. 1.*

"Goombah—Preview," http://www.goombah.com/preview.html, printed Jan. 8, 2008, 5 pages.

Jeff Mascia et al., "Lifetrak: Music in Tune With Your Life," copyright 2006, 11 pages.

Jun Wang et al., "Music Recommender System for Wi-Fi Walkman," Delft University of Technology, 23 pages.

Gracenote, http://www.gracenote.com/.

Billboard.biz, http://www.billboard.biz/bbbiz/index.jsp.

(56) References Cited

OTHER PUBLICATIONS

The Internet Movie Database, http://www.imdb.com/.
The Classic TV Database, http://www.classic-tv.com/.
Soundflavor DJ for iTunes, http://www.soundflavor.com/.
Pandora Internet Radio, http://www.pandora.com/.
Music IP The Music Search Engine, http://www.musicip.com/.
Last.fm The Social Music Revolution, http://www.last.fm/.
Webjay Playlist Community, http://www.webjay.org/.
Mercora Music Search and Internet Radio Network, http://search.mercora.com/v6/_front/web.jsp.
MyStrands Social Recommendation and Discovery, http://www.mystrands.com/.
Better Propaganda Free MP3s and music videos, http://betterpropaganda.com/.
Loomia Personalized Recommendations for Media, Content and Retail Sites, http://www.loomia.com/.
MP3 music download website, eMusic, http://www.emusic.com/.
Welcome to the Musicmatch Guide, http://www.mmguide.musicmatch.com/.
Up to 11.net Music Recommendations and Search, http://www.upto11.net/.
Try Napster free for 7 Days, http://www.napster.com/choose/index.html.
Apple—iPod + iTunes, http://www.apple.com/itunes/.
GenieLab.com grants music lovers' wishes, http://barometer.orst.edu/home/index.cfm?event=displayArticlePrinterFriendly&uStory_id=5c420acf-a1fb-448c-8ffd-39ec5c448b6f.
That canadian girl blog archive—GenieLab, http://www.thatcanadiangirl.co.uk/blog/2005/02/22/genielab/.
Digital Tech Life Download of the Week, http://www.digitaltechlife.com/category/download-of-the-week/.
Music Recommendations 1.0, http://www.macupdate.com/info.php/id/19575.
"Amazon.com: Online Shopping for Electronics, Apparel, Computers, Books, DVDs & m . . . ," http://www.amazon.com/, copyright 1996-2007 Amazon.com, Inc., printed Oct. 26, 2007, 4 pages.
"Apple—iPod classic," http://www.apple.com/ipodclassic/, printed Oct. 26, 2007, 1 page.
"Bluetooth.com—Learn," http://www.bluetooth.com/Bluetooth/Learn/, copyright 2007 Bluetooth SIG, Inc., printed Oct. 26, 2007, 1 page.
"ChoiceStream Technology Brief, Review of Personalization Technologies: Collaborative Filtering vs. ChoiceStream's Attributized Bayesian Choice Modeling," 13 pages.
"GenieLab::Music Recommendation System," http://web.archive.org/web/20060813000442/http://genielab.com/, copyright 2005 GenieLab, LLC, printed Oct. 26, 2007, 1 page.
"Gracenote Playlist," Revised Dec. 29, 2005, 2 pages.
"Gracenote Playlist Plus," Revised Dec. 29, 2005, 2 pages.
"IEEE 802.11—Wikipedia, the free encyclopedia," http://en.wikipedia.org/wiki/IEEE_802.11, printed Oct. 26, 2007 5 pages.
"iLikeTM—Home," http://www.ilike.com/, copyright 2007 iLike, printed May 17, 2007, 2 pages.
"Last.fm—Wikipedia, the free encyclopedia," http://en.wikipedia.org/wiki/Last.fm, printed Aug. 8, 2006, 7 pages.
"LimeWire—Wikipedia, the free encyclopedia," http://en.wikipedia.org/wiki/LimeWire, printed Aug. 8, 2006, 2 pages.
"Liveplasma music, movies, search engine and discovery engine," http://www.liveplasma.com, printed May 17, 2007 1 page.
"Mercora—Music Search and Internet Radio Network," http://www.mercora.com/overview.asp, copyright 2004-2006 Mercora, Inc., printed Aug. 8, 2006, 1 page.
"Mongomusic.com—The Best Download mp3 Resources and Information. This website is for sale!," http://www.mongomusic.com/, printed May 17, 2007, 2 pages.
"Take a look at the Future of Mobile Music :: Music Guru," http://www.symbian-freak.com/news/006/02/music_guru.htm, copyright 2005 Symbian freak, printed Feb. 7, 2007, 3 pages.
"MusicGremlin," http://www.musicgremlin.com/StaticContent.aspx?id=3, copyright 2005, 2006, 2007 MusicGremlin, Inc., printed Oct. 26, 2007, 1 page.
"Digital Music News," http://www.digitalmusicnews.com/results?title=musicstrands, copyright 2003-6 Digital Music News, printed Aug. 8, 2006, 5 pages.
"MyStrands for Windows 0.7.3 Beta," copyright 2002-2006 ShareApple.com networks, printed Jul. 16, 2007, 3 pages.
"MyStrands for Windows Change Log," http://www.mystrands.com/mystrands/windows/changelog.vm, printed Jul. 16, 2007, 6 pages.
"Napster—All the Music You Want," http://www.napster.com/using_napster/all_the_music_you_want.html, copyright 2003-2006 Napster, LLC, printed Feb. 7, 2007, 2 pages.
"FAQ," http://blog.pandora.com/faq/, copyright 2005-2006 Pandora Media, Inc., printed Aug. 8, 2006, 20 pages.
"Pandora Radio—Listen to Free Internet Radio, Find New Music," http://www.pandora.com/mgp, copyright 2005-2007 Pandora Media, Inc., printed Oct. 26, 2007, 1 page.
"Rhapsody—Full-length music, videos and more—Free," http://www.rhapsody.com/welcome.html, copyright 2001-2007 Listen.com, printed Feb. 7, 2007, 1 page.
Badrul M. Sarwar et al., "Recommender Systems for Large-scale E-Commerce: Scalable Neighborhood Formation Using Clustering," 2002, 6 pages.
"Wired News:," http://www.wired.com/news/digiwoo/1,57634-0.html, copyright 2005 Lycos, Inc., printed Oct. 9, 2006, 3 pages.
"Yahoo! Messenger—Chat, Instant message, SMS, PC Calls and More," http://messenger.yahoo.com/webmessengerpromo.php, copyright 2007 Yahoo! Inc., printed Oct. 26, 2007, 1 page.
"Yahoo Music Jukebox—Wikipedia, the free encyclopedia," http://en.wikipedia.org/wiki/Yahoo_music_engine, printed Aug. 8, 2006, 1 page.
"Music Downloads—Over 2 Million Songs—Try It Free—Yahoo! Music," http://music.yahoo.com/ymu/default.asp, copyright 2006 Yahoo! Inc., printed Feb. 7, 2007, 1 page.
"YouTube—Broadcast Yourself.," http://www.youtube.com/, copyright 2007 YouTube, LLC, printed Oct. 26, 2007, 2 pages.
"Instant Messenger—AIM—Instant Message Your Online Buddies for Free—AIM," http://dashboard.aim.com/aim, copyright 2007 AOL LLC, printed Nov. 8, 2007, 6 pages.
"Outlook Home Page—Microsoft Office Online," http://office.microsoft.com/en-us/outlook/default.aspx, copyright 2007 Microsoft Corporation, printed Nov. 8, 2007, 1 page.
"Thunderbird—Reclaim your inbox," http://www.mozilla.com/en-US/thunderbird/, copyright 2005-2007 Mozilla, printed Nov. 8, 2007, 2 page.
"RYM FAQ—Rate Your Music," http://rateyourmusic.com/faq/, copyright 2000-2007 rateyourmusic.com, printed Nov. 8, 2007, 14 pages.
"Trillian (software)—Wikipedia, the free encyclopedia," http://en.wikipedia.org/wiki/Trillian_(instant_messenger), printed Nov. 8, 2007, 11 pages.
"Not safe for work—Wikipedia, the free encyclopedia," http://en.wikipedia.org/wiki/Work_safe, printed Nov. 8, 2007, 2 pages.
"Zune.net—How-To-Share Audio Files Zune to Zune," http://web.archive.org/web/20070819121705/http://www.zune.net/en-us/support/howto/z . . . , copyright 2007 Microsoft Corporation, printed Nov. 14, 2007, 2 pages.
"LAUNCHcast Radio—Yahoo! Messenger," http://messenger.yahoo.com/launch.php, copyright 2007 Yahoo! Inc. printed Nov. 8, 2007, 1 page.
"Babulous :: Keep it loud," http://www.babulous.com/home.jhtml, copyright 2009 Babulous, Inc., printed Mar. 26, 2009, 2 pages.
Jennifer Golbeck, "Trust and Nuanced Profile Similarity in Online Social Networks," available from http://www.cs.umd.edu/~golbeck/publications.shtml, 2008, 30 pages.
"MixxMaker: The Mix Tape Goes Online—AppScout," http://www.appscout.com/2008/01/mixxmaker_the_mixtape_goes_onl_1.php, copyright 1996-2009 Ziff Davis Publishing Holdings Inc., printed Aug. 3, 2009, 3 pages.
"Tour's Profile," http://mog.com/Tour, copyright 2006-2009 Mog Inc., printed Aug. 3, 2009, 11 pages.

(56) References Cited

OTHER PUBLICATIONS

"Ringo: Social Information Filtering for Music Recommendation," http://jolomo.net/ringo.html, printed Aug. 3, 2009, 1 page.

"About uPlayMe," copyright 2008 uPlayMe, Inc., 4 pages.

"Collect everything you listen to and watch in one place, and effortlessly share them with your friends.," copyright 2008 uPlayMe, Inc., 1 page.

"How many songs are in your iTunes Music library (or libraries in total, if you use more than one)?," http://www.macoshints.com/polls/index.php?pid=itunesmusiccount, printed Feb. 24, 2010, copyright 2010 Mac Publishing LLC, 10 pages.

"Identifying iPod models," http://support.apple.com/kb/HT1353, printed Feb. 24, 2010, 13 pages.

Mitchell, Bradley, "Cable Speed—How Fast is Cable Modem Internet?," http://www.compnetworking.about.com/od/internetaccessbestuses/f/cablespeed.htm, printed Feb. 24, 2010, 2 pages.

"What is the size of your physical and digital music collection?," http://www.musicbanter.com/general-music/47403-what-size-your-physical-digital-music-collection-12.html, printed Feb. 24, 2010, copyright 2010 Advameg, Inc., 6 pages.

"Hulu—About," www.hulu.com/about/product_tour, copyright 2010 Hulu LLC, printed Jun. 15, 2010, 2 pages.

Nilson, Martin, "id3v2.4.0-frames—ID3.org," http://www.id3.org/id3v2.4.0-frames, Nov. 1, 2000, copyright 1998-2009, printed Jun. 15, 2010, 31 pages.

"Songbird," http://getsongbird.com/, copyright 2010 Songbird, printed Jun. 15, 2010, 2 pages.

"SongReference," http://songreference.com/, copyright 2008, SongReference.com, printed Jun. 15, 2010, 1 page.

\* cited by examiner

HISTORICAL MEDIA RECOMMENDATION SERVICE

FIELD OF THE INVENTION

The present invention relates to a media recommendation service for recommending media content to a user.

BACKGROUND OF THE INVENTION

Recent years have seen a shift in music listening habits from physical media such as Compact Discs (CDs) and cassettes to digital media stored on the user's playback device such as Moving Pictures Experts Group Layer 3 (MP3) files. This transition has made music much more accessible to listeners worldwide. However, the increased accessibility of music has only heightened a long-standing problem for the music industry, which is namely the issue of linking audiophiles with new music that matches their listening preferences.

Many companies, technologies, and approaches have emerged to address this issue of music recommendation. Some companies have taken an analytical approach. They review various attributes of a song, such as melody, harmony, lyrics, orchestration, vocal character, and the like, and assign a rating to each attribute. The ratings for each attribute are then assembled to create a holistic classification for the song that is then used by a recommendation engine. The recommendation engine typically requires that the user first identify a song that he or she likes. The recommendation engine then suggests other songs with similar attributions. Companies using this type of approach include Pandora (http://www.pandora.com), SoundFlavor (http://www.soundflavor.com), MusicIP (http://www.musicip.com), and MongoMusic (purchased by Microsoft in 2000).

Other companies take a communal approach. They make recommendations based on the collective wisdom of a group of users with similar musical tastes. These solutions first profile the listening habits of a particular user and then search similar profiles of other users to determine recommendations. Profiles are generally created in a variety of ways such as looking at a user's complete collection, the playcounts of their songs, their favorite playlists, and the like. Companies using this technology include Last.fm (http://www.last.fm), Music Strands (http://www.musicstrands.com), WebJay (http://www.webjay.org), Mercora (http://www.mercora.com), betterPropaganda (http://www.betterpropaganda.com), Loomia (http://www.loomia.com), eMusic (http://www.emusic.com), musicmatch (http://www.m-mguide.musicmatch.com), genielab (http://genielab.com/), upto11 (http://www.upto11.net/), Napster (http://www.napster.com), and iTunes (http://www.itunes.com) with its celebrity playlists.

The problem with the prior art is that it fails to incorporate a pop culture historical context to music recommendation. For many users, musical preferences are heavily influenced by the type and nature of music that was popular at the time they became interested in music, as witnessed by the popularity of oldies radio stations (i.e., stations playing music from the 1950s) and classic rock stations (i.e., stations playing music from the 1970s and 1980s). Further, their musical tastes are also influenced by the type and nature of other media (such as movies and television) that were popular at particular points in time. For instance, movies such as Saturday Night Fever, Grease, Chariots of Fire, Top Gun, Footloose, Flashdance, The Breakfast Club, and Pretty Woman and television shows such as MASH, Cheers, Happy Days, Fame, and Moonlighting all had soundtracks that enjoyed great popularity in their respective time periods.

For example, a user may like a particular artist from the early 1980s, such as Michael Jackson, but they might also enjoy songs from the television show Fame and the film Top Gun. However, recommendation systems based on music similarity would fail to make these suggestions to the user. As for communal based recommendation systems, they may perform marginally better in this case. More specifically, since communal based recommendation systems rely primarily on musical relationships set forth by particular users, they will inherently reflect some degree of pop culture association in their music recommendations. In other words, some people will remember artists, songs, and movies that were popular at the same time as another given artist or song or movie, and their collections and profile will reflect these associations. However, memory can be unreliable, and it is dubious that one user or collection of users can make all of the associations.

Therefore, there is a need for a media recommendation system that provides recommendations based on a historical context.

SUMMARY OF THE INVENTION

The present invention provides a media recommendation system for recommending media content that is historically related to seed media content. The recommended media content may be songs, television programs, movies, or a combination thereof, and the seed media content may be a song, television program, or movie.

In one embodiment, the media recommendation service provides music recommendations to the user based on a seed song. In general, information identifying the seed song is provided to a central server. The central server obtains historical information for the seed song such as the release date of the seed song, the date the seed song first appeared on the music charts, the duration of the seed song on the music charts, the date the seed song obtained its peak position on the music charts, and the like. Based on the historical information, the central server identifies a time window for the seed song. The central server then queries a music database to identify other songs or albums that were popular during the same time window as the seed song. The central server may also query a television database and a movie database to identify songs or albums associated with television programs or movies that were popular during the same time window as the seed song. The songs or albums obtained from the various databases are then aggregated and, optionally, ordered by the central server to provide a list of recommended music. The list of recommended music is then provided to the user. In a similar fashion, other types of media content such as television programs and movies may be recommended based on the seed song.

In another embodiment, the media recommendation service provided by the central server may recommend music, television programs, movies, or any combination thereof based on a seed song, seed album, seed television program, or seed movie.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 1 illustrates a media recommendation system operating to recommend media content historically related to seed media content according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
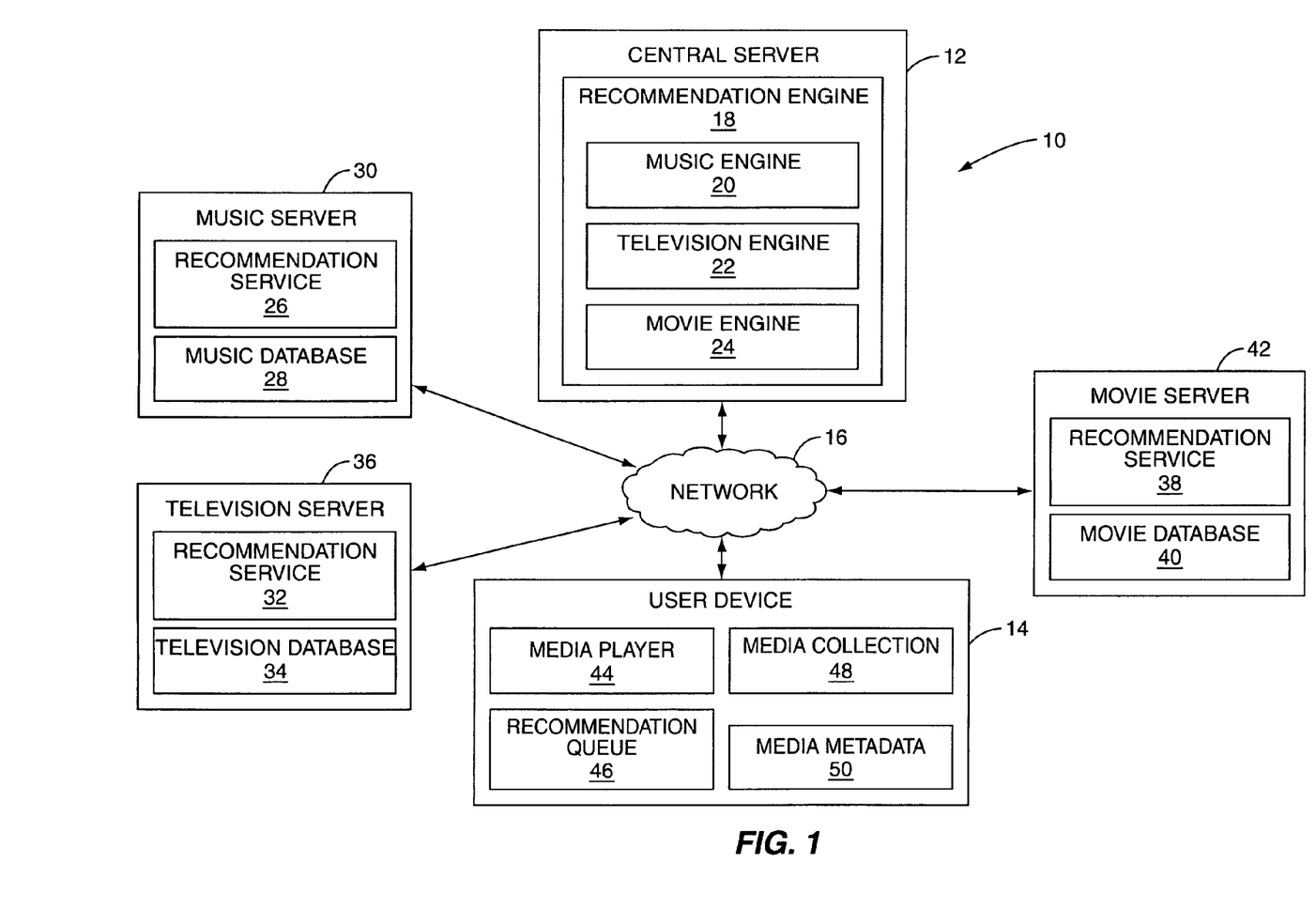

FIG. 1 illustrates a media recommendation system 10 according to one embodiment of the present invention. While the following discussion focuses on recommending songs to a user based on a seed song, the present invention is not limited thereto. The system 10 may operate to recommend songs, albums, television programs, movies, or any combination thereof based on a seed song, album, television program, or movie. In general, the system 10 includes a central server 12 and a user device 14 interconnected by a network 16, which may be a distributed public network such as the Internet. Note that while only one user device 14 is illustrated for clarity, the central server 12 may provide media recommendation services to any number of user devices. Further, while the central server 12 is illustrated as a single server, the central server 12 may alternatively be implemented as a number of distributed servers.

The central server 12 includes a recommendation engine 18. The recommendation engine 18 may be implemented in software, hardware, or a combination of software and hardware. The recommendation engine 18 includes a music engine 20, a television engine 22, and a movie engine 24. As discussed below, the music engine 20 communicates with recommendation service 26 to query a music database 28 to obtain historical information for a seed song, where in this embodiment the recommendation service 26 and the music database 28 are hosted by a music server 30. The recommendation engine 18 then determines a time window for the seed song based on the historical information, and the music engine 20 sends a request to the recommendation service 26 such that the music database 28 is queried to identify other songs historically related to the seed song. The television engine 22 communicates with a recommendation service 32 to query a television database 34 based on the time window of the seed song to identify songs associated with television programs that are historically related to the seed song. In this embodiment, the recommendation service 32 and the television database 34 are hosted by a television server 36. In a similar fashion, the movie engine 24 operates to communicate with a recommendation service 38 to query a movie database 40 based on the time window of the seed song to identify songs associated with movies that are historically related to the seed song. In this embodiment, the recommendation service 38 and the movie database 40 are hosted by a movie server 42.

While the databases 28, 34, and 40 are illustrated as three separate databases hosted by three separate servers, the present invention is not limited thereto. For example, the television and movie databases 34 and 40 may be hosted by a single server and may be implemented as a single database. Further, each of the databases 28, 34, and 40 may be implemented as a single database or as a number of distributed databases. Existing databases that may be used or modified to be used by the system 10 include, but are not limited to, the Gracenote music database available at http://www.gracenote.com, the Billboard music charts available at http://www.billboard.biz, the Classic TV database available at http://www.classic-tv.com, and the IMDB movie and television database available at http://www.imdb.com.

The user device 14 may be, for example, a personal computer, a laptop computer, a Personal Digital Assistant (PDA), mobile telephone, or the like having access to the network 16. In this embodiment, the user device 14 includes a media player 44, a recommendation queue 46, a media collection 48, and media metadata 50. The media player 44 may be implemented in software, hardware, or a combination of hardware and software and operates to play media content such as, for example, songs and videos. As discussed below, in one embodiment, the recommendation services of the central server 12 are invoked when a song is played by the media player 44. The recommendation queue 46 may be implemented as part of the media player 44 or as part of an application associated with the central server 12 and operates to store recommendations, such as a list of recommended songs, provided by the central server 12. The recommendations may be presented to the user via the media player 44 or, alternatively, a custom application.

In one embodiment, the media collection 48 includes a number of songs forming the user's media, or music, collection. The media collection 48 may additionally include a number of television programs such as episodes of "Lost," a number of movies, or both television programs and movies. The media metadata 50 is information describing the content of the media collection 48. Note that while the media metadata 50 is illustrated as being separate from the media collection 48, the media metadata 50 may alternatively be stored as part of the media files forming the media collection 48. As an example, for a song, the media metadata 50 may include ID3 tags, which include information such as, but not limited to, the title of the song, artist of the song, album from which the song came, date of release, lyrics, and the like. Further, the metadata for the song may be included within the digital song file. Alternatively, the metadata for the song may be stored in an application file associated with, for example, the media player 44.

Figure 2:
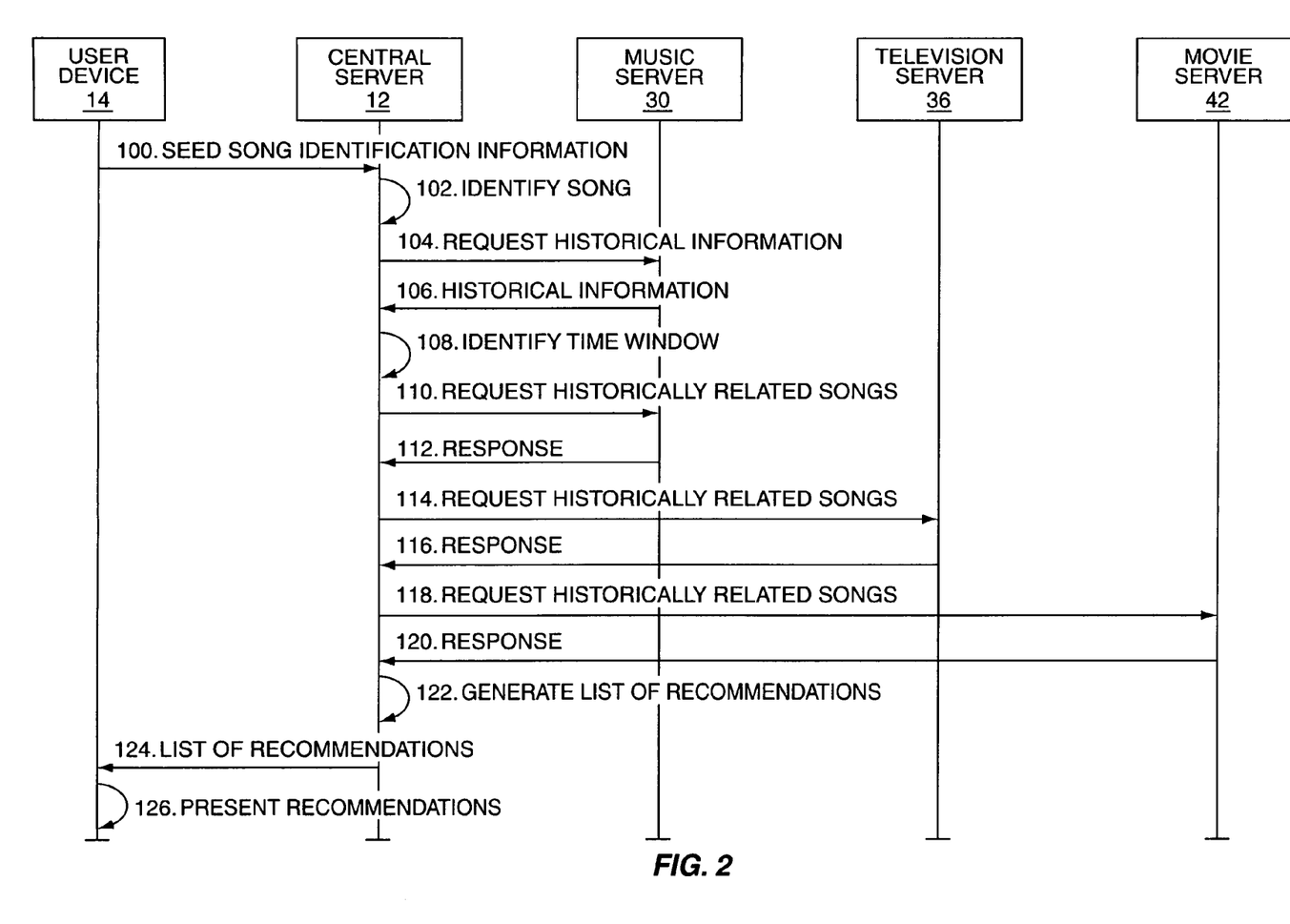
FIG. 2 illustrates the operation of the system of FIG. 1 to recommend songs historically related to a seed song according to one embodiment of the present invention.

FIG. 2 illustrates the operation of the system 10 of FIG. 1 according to one embodiment of the present invention. Again, while FIG. 2 focuses on the situation where the central server 12 provides recommended songs based on a seed song, the present invention is not limited thereto. First, seed song identification information is provided from the user device 14 to the central server 12 (step 100). The seed song identification information may be provided based on a manual request by the user of the user device 14 for recommendations based on a particular seed song, or may be automatically provided when, for example, the seed song is played by the media player 44 of the user device 14. The seed song identification information includes the metadata for that song, which may include, for example, title, artist, album, release date, lyrics, and the like. The seed song identification information may additionally or alternatively include one or more samples of the seed song or one or more fingerprints for the seed song generated by the user device 14. The samples or fingerprints for the seed song may be used by the central server 12 to identify the seed song or to validate that the metadata provided by the user device 14 for the seed song is correct. For further details of identifying a song based on samples of the song or fingerprints for the song, the interested reader is directed to commonly owned and assigned U.S. patent application Ser. No. 11/392,051, entitled SYSTEM AND METHOD FOR ARCHIVING A MEDIA COLLECTION, filed Mar. 29, 2006, which is hereby incorporated herein by reference in its entirety.

The central server 12 then identifies the song based on the seed song identification information (step 102). Once identified, the central server 12, and more specifically the music engine 20 of the recommendation engine 18, requests historical information for the seed song from the music server 30 (step 104), and the music server 30 obtains the requested historical information from the music database 28 and returns the historical information to the central server 12 (step 106). The historical information may include information identifying any and all albums on which the seed song was released, a release date for the seed song, the release date for each album on which the seed song was released, a date that the seed song first appeared on the music charts, a duration or range of dates that the seed song remained on the music charts, a date that the seed song first went off of the music charts, the beginning position of the seed song on the music charts, the highest position the seed song obtained on the music charts, the position of the seed song on the music charts immediately before leaving the music charts, and the like. All or a portion of the historical data may be included within the metadata for the song provided from the user device 14. If so, the recommendation engine 18 may obtain the historical information from the metadata rather than the music server 30. Exemplary music charts are the Billboard music charts, the Contemporary Hit Radio music charts, the American Bandstand music charts, the American Top 40 music charts, the VH1 music charts, the MTV music charts, the Hit Parade music charts, the UK Singles Charts, and EuroChart. However, other music charts may additionally or alternatively be used. Note that media popularly charts may be used herein to generally refer to music charts, television charts, and movie charts providing the relative popularity songs, music albums, television programs, and movies.

Once the historical information is obtained, the recommendation engine 18 identifies a time window for the seed song (step 108). While this discussion focuses on a single time window, multiple time windows for the seed song may be identified and used by the recommendation engine 18. Generally, the time window for the song is a time period during which the seed song was popular in society. More specifically, as a first example, the time window may be a predetermined time period around the initial release date of the seed song. Thus, if the seed song was released in June of 1983, the time window may be identified as, for example, the two month period of Jun. 1, 1983 to Jul. 31, 1983. As a second example, the time window may correspond to the time period that the seed song was on the music charts. Thus, if the seed song was on the Billboard music charts from Mar. 15, 1985 to Jun. 1, 1985, the time window may be, for example, Mar. 15, 1985 to Jun. 1, 1985 or Mar. 1, 1985 to Jun. 30, 1985. As a third example, the time window may correspond to the time that the seed song first occupied the music charts, the time that the seed song reached its peak position on the music charts, the time that the seed song exited the music charts, a time that the seed song was re-released, or the like.

After identifying the time window for the seed song, the music engine 20 of the central server 12 sends a request to the music server 30, and more specifically the recommendation service 26, for other songs historically related to the seed song (step 110). The request includes the time window for the seed song. In response, the recommendation service 26 queries the music database 28 based on the time window for the seed song and sends a response including a list of songs historically related to the seed song to the central server 12 (step 112). The songs returned by the recommendation service 26 of the music server 30 may include, for example, songs released during the time window for the seed song, songs that were on one or more music charts during the time window for the seed song, songs by artists that had a song on one or more music charts during the time window for the seed song, songs by artists who released a song or album during the time window for the seed song, or the like.

The number of songs returned by the music server 30 may be reduced by using additional criteria. As a first example, either the recommendation engine 18 or the recommendation service 26 may randomly select songs from one or more music charts during the time window for the seed song rather than selecting all songs from the music charts during the time window for the seed song. As a second example, either the recommendation engine 18 or the recommendation service 26 may select only those songs from one or more music charts during the time window for the seed song that occupied a position in the charts above a threshold such as the 10th position on the charts. As a third example, songs returned by the music server 30 may be filtered based on criteria such as one or more music attributes of the seed song or based on communal profiles for the seed song.

Next, the television engine 22 of the central server 12 sends a request to the television server 36, and more specifically the recommendation service 32, for songs associated with television programs historically related to the seed song (step 114). The request includes the time window for the seed song. In response, the television server 36 returns a list of songs associated with television programs historically related to the seed song (step 116). More specifically, using the time window for the seed song, the recommendation service 32 queries the television database 34 to identify television programs that were popular or originally released during the time window for the seed song. The recommendation service 32 then identifies any songs, such as soundtracks, associated with the identified television programs. For example, television shows such as "MASH," "Cheers," "Happy Days," "Fame," and "Moonlighting" had soundtracks that enjoyed great popularity during their respective time periods. Note that once the recommendation service 32 determines that a television program has an associated soundtrack, the recommendation service 32 may query the music server 30 to identify the songs on the soundtrack if the television database 34 does not include this information. Still further, the recommendation service 32 may determine whether the directors, producers, and actors associated with the identified television programs are also associated with other television shows. If so, the recommendation service 32 may further identify songs for those television shows.

Next, the movie engine 24 of the central server 12 sends a request to the movie server 42, and more specifically the recommendation service 38, for songs associated with movies historically related to the seed song (step 118). The request includes the time window for the seed song. In response, the movie server 42 returns a list of songs associated with movies historically related to the seed song (step 120). More specifically, using the time window for the seed song, the recommendation service 38 queries the movie database 40 to identify movies that were popular or originally released during the time window for the seed song. The recommendation service 38 then identifies any songs, such as soundtracks, associated with the identified movies. Note that once the recommendation service 38 determines that a movie has an associated soundtrack, the recommendation service 38 may query the music server 30 to identify the songs on the soundtrack if the movie database 40 does not include this information. Still further, the recommendation service 38 may determine whether the directors, producers, and actors associated with the identified movies are also associated with other movies. If so, the recommendation service 38 may further identify songs for those movies.

The number of songs returned by the music, television, and movie servers 30, 36, and 42 may be reduced by filtering the songs either at the recommendation engine 18 or the respective recommendation services 26, 32, and 38 based on music attributes, where only songs having music attributes similar to those of the seed song will be recommended to the user. In another embodiment, the songs returned by the servers 30, 36, and 42 may be filtered at the user device 14. The music attributes may include, for example, but are not limited to genre, melody, tone, beats-per-minute, and the like. The number of songs may additionally or alternatively be reduced by using communal user music profiles to identify songs that are similar to the seed song. More specifically, the system 10, and more specifically the central server 12, may maintain profiles for each user in the system 10, where the profiles may include information such as, but not limited to, information identifying the songs in the user's music collection, the playcounts of the songs in the user's music collection, favorite playlists, and the like. Using the profiles of other users having the seed song in their music collections or on their favorite playlists, the recommendation engine 18, or alternatively the user device 14, may filter the songs from the servers 30, 36, and 42 based on the profiles of those users. For example, songs from the servers 30, 36, and 42 that do not appear in the music collection of other users who have the seed song in their music collection or on their favorite playlists may be filtered, where the filtered songs are not recommended to the user at the user device 14.

At this point, the central server 12, and more specifically the recommendation engine 18, generates a list of recommended songs based on the responses from the servers 30, 36, and 42 (step 122). The list of recommended songs may be in any desired order. In one embodiment, the list first includes songs from the music server 30, then songs from the television server 36, and then songs from the movie server 42. In another embodiment, the songs from the servers 30, 36, and 42 are randomly sorted to provide the list of recommended songs. In yet another embodiment, the songs from the servers 30, 36, and 42 may be assigned a score or priority based on a comparison of the music attributes of the songs with the music attributes of the seed song. Then, the songs may be sorted by their scores or priorities to provide the list of recommended songs.

The list of recommended songs is then provided to the user device 14 (step 124). The list of recommended songs may include information identifying the recommended songs, Uniform Resource Locators (URLs) enabling download or streaming of the recommended songs from a subscription based music service, URLs enabling purchase and download of the recommended songs from an e-commerce site, URLs enabling playback of samples of the recommended songs, samples of the recommended songs, or the like, or any combination thereof. Once at the user device 14, the recommended songs may be presented to the user of the user device 14 (step 126). For example, the recommended songs may be presented as a list including the information identifying the songs with URLs enabling playback of samples and, if desired, purchase of the recommended songs. The recommended songs may alternatively be presented to the user at the user device 14 as a playlist for the media player 44. This may be particularly beneficial where the user has access to a subscription based music service.

Figure 3:
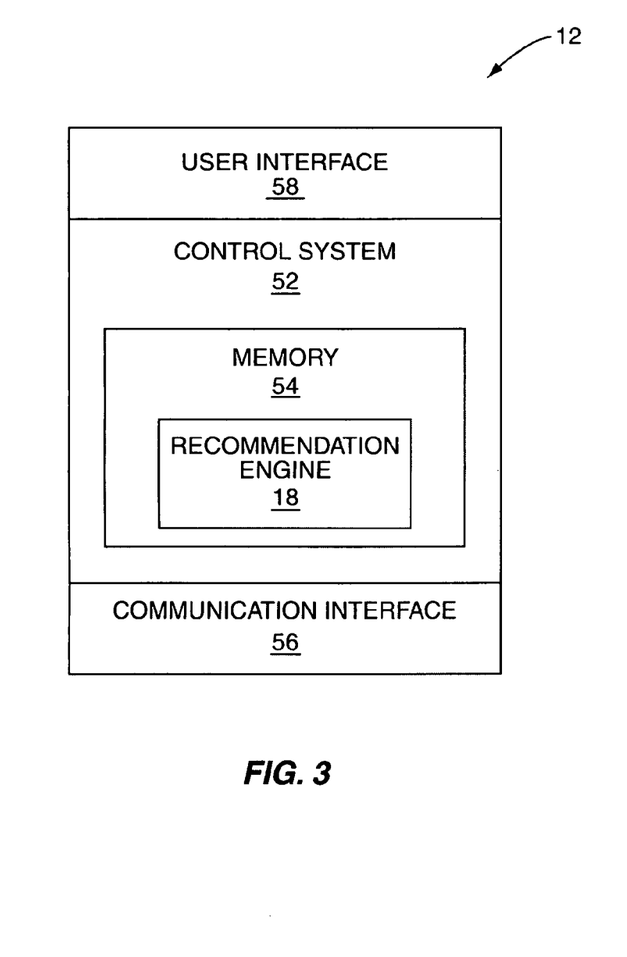
FIG. 3 is an exemplary block diagram of the central server of FIGS. 1 and 2 according to one embodiment of the present invention.

FIG. 3 is a block diagram of an exemplary embodiment of the central server 12. In general, the central server 12 includes a control system 52 having associated memory 54. In this example, the recommendation engine 18 is at least partially implemented in software. As such, the recommendation engine 18 is stored in the memory 54 and operates to instruct the control system 52 to operate according to the present invention. The central server 12 also includes a communication interface 56 communicatively coupling the central server 12 to the network 16 (FIG. 1). In addition, the central server 12 may include a user interface 58, which may include components such as, for example, a display, keyboard or other input device, and the like.

Figure 4:
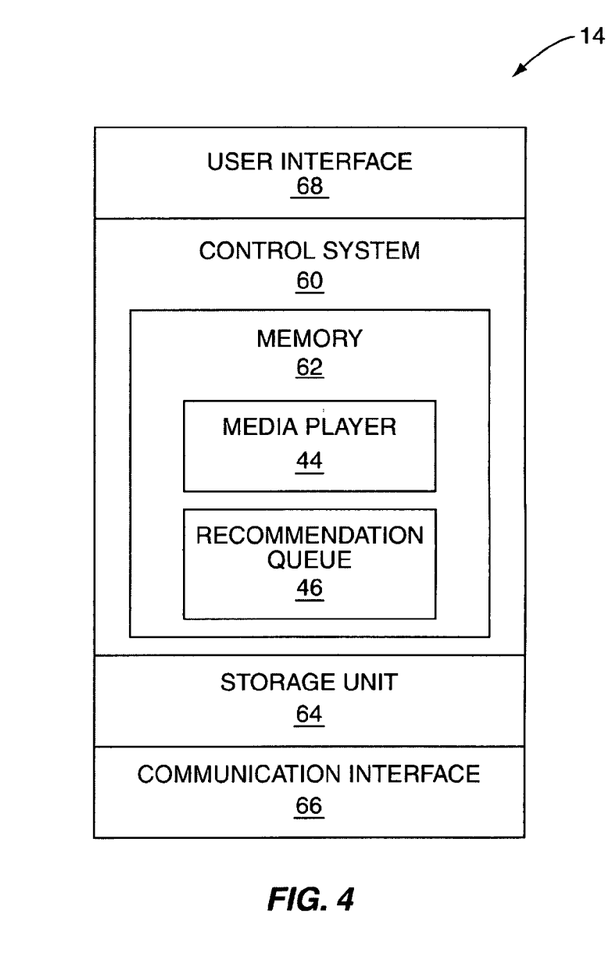
FIG. 4 is an exemplary block diagram of the user device of FIGS. 1 and 2 according to one embodiment of the present invention.

FIG. 4 is a block diagram of an exemplary embodiment of the user device 14. In general, the user device 14 includes a control system 60 having associated memory 62. In this example, the media player 44 is implemented at least partially in software and is stored in memory 62. The recommendation queue 46 may also be implemented in the memory 62. The user device 14 may also include a storage unit 64 which may be, for example, a hard-disc drive or the like. The storage unit 64 operates to store the media collection 48 and the media metadata 50. The user device 14 also includes a communication interface 66 communicatively coupling the user device 14 to the network 16 (FIG. 1). The communication interface 66 may provide, for example, a wired or wireless connection to the network 16. The user device 14 may also include a user interface 68, which may include components such as, for example, a display, keyboard or other input device, and the like.

The present invention provides substantial opportunity for variation without departing from the spirit or scope of the present invention. Numerous variations will be apparent to one of ordinary skill in the art upon reading this disclosure. For example, a single server may host all three of the databases 28, 34, and 40. As another example, the databases 28, 34, and 40 may be stored locally at the central server 12. As yet another example, while the time window for the seed song provided to each of the servers 30, 36, and 42 is the same in the discussion above, the present invention is not limited thereto. The narrowness or breadth of the time window for each of the servers 30, 36, and 42 may be determined based on, for example, a priority assigned to each of the servers 30, 36, and 42. For instance, the music server 30 may have a higher priority than the television and music servers 36 and 42. As such, the time window for the request sent to the music server 30 may be broader than the time windows for the requests sent to the television and music servers 36 and 42.

In addition, while the discussion above focuses on recommending songs historically related to a seed song, the present invention is not limited thereto. More specifically, the central server 12 may recommend songs, music albums, television programs, movies, or any combination thereof based on a seed song, seed television program, or seed movie. For example, based on a seed song, the recommendation engine 18 of the central server 12 may query the music server 30 to identify songs historically related to the seed song, query the television server 36 to identify television programs historically related to the seed song and songs associated with the historically related television programs, and query the movie server 42 to identify movies historically related to the seed song and songs associated with the historically related movies. The central server 12 may then recommend songs, television programs, and movies historically related to the seed song.

In a similar fashion, if a seed television program is used, the central server 12 may query the television server 36 to obtain historical information for the seed television program, and then determine a time window for the seed television program. The recommendation engine 18 of the central server 12 may query the music server 30 to identify songs historically related to the seed television program, query the television server 36 to identify television programs historically related to the seed television program and songs associated with the historically related television programs, and query the movie server 42 to identify movies historically related to the seed television program and songs associated with the historically related movies. The central server 12 may then recommend songs, television programs, and movies historically related to the seed television program.

If a seed movie is used, the central server 12 may query the movie server 42 to obtain historical information for the seed movie, and then determine a time window for the seed movie. The recommendation engine 18 of the central server 12 may query the music server 30 to identify songs historically related to the seed movie, query the television server 36 to identify television programs historically related to the seed movie and songs associated with the historically related television programs, and query the movie server 42 to identify movies historically related to the seed movie and songs associated with the historically related movies. The central server 12 may then recommend songs, television programs, and movies historically related to the seed movie.

Those skilled in the art will recognize improvements and modifications to the preferred embodiments of the present invention. All such improvements and modifications are considered within the scope of the concepts disclosed herein and the claims that follow.

What is claimed is:

1. A method of operating a digital computing device programmed to provide media recommendations historically related to seed media content, comprising:
   receiving information identifying seed media content;
   obtaining historical information regarding the seed media content;
   determining a time window for the seed media content based on the historical information;
   querying a video database based on the time window to identify songs associated with videos historically related to the seed media content; and
   recommending at least a subset of the songs associated with the videos historically related to the seed media content to a user.

2. The method of claim 1 wherein the seed media content is one of a group consisting of: a seed song, a seed music album, a seed television program, and a seed movie.

3. The method of claim 1, further comprising:
   identifying other videos related to the videos historically related to the seed media content;
   identifying songs associated with the other videos; and
   recommending at least a subset of the songs associated with the other videos to the user.

4. The method of claim 3 wherein identifying the other videos comprises identifying videos having at least one of a group consisting of: an actor, an actress, a director, and a producer in common with the videos historically related to the seed media content.

5. The method of claim 1 wherein receiving the information identifying the seed media content comprises receiving metadata describing the seed media content.

6. The method of claim 1 wherein the video database is a television program database.

7. The method of claim 1 wherein the video database is a movie database.

8. The method of claim 1 wherein determining the time window for the seed media content comprises determining the time window for the seed media content based on the historical information such that the time window for the seed media content is a time period related to when the seed media content was on at least one media popularity chart.

9. The method of claim 8 wherein the time period related to when the seed media content was on the at least one media popularity chart substantially corresponds to a range of dates during which the seed media content was on the at least one media popularity chart.

10. The method of claim 8 wherein the time period related to when the seed media content was on the at least one media popularity chart includes a date that the seed media content first entered the at least one media popularity chart.

11. The method of claim 8 wherein the time period related to when the seed media content was on the at least one media popularity chart includes a date that the seed media content reached a peak position on the at least one media popularity chart.

12. The method of claim 8 wherein the time period related to when the seed media content was on the at least one media popularity chart includes a date that the seed media content exited the at least one media popularity chart.

13. A non-transitory computer-readable medium storing software for instructing a digital computing device to:
    receive information identifying seed media content;
    obtain historical information regarding the seed media content;
    determine a time window for the seed media content based on the historical information;
    query a video database based on the time window to identify songs associated with videos historically related to the seed media content; and
    recommend at least a subset of the songs associated with the videos historically related to the seed media content to a user.

14. The non-transitory computer-readable medium of claim 13 wherein the software further instructs the digital computing device to:
    identify other videos related to the videos historically related to the seed media content;
    identify songs associated with the other videos; and
    recommend at least a subset of the songs associated with the other videos to the user.

15. The non-transitory computer-readable medium of claim 14 wherein in order to identify the other videos, the software further instructs the digital computing device to identify videos having at least one of a group consisting of: an actor, an actress, a director, and a producer in common with the videos historically related to the seed media content.

16. The non-transitory computer-readable medium of claim 13 wherein the seed media content is one of a group consisting of: a seed song, a seed music album, a seed television program, and a seed movie.

17. The non-transitory computer-readable medium of claim 13 wherein the information identifying the seed media content comprises metadata describing the seed media content.

18. The non-transitory computer-readable medium of claim 13 wherein the video database is a television program database.

19. The non-transitory computer-readable medium of claim 13 wherein the video database is a movie database.

20. The non-transitory computer-readable medium of claim 13 wherein the time window for the seed media content is a time period related to when the seed media content was on at least one media popularity chart.

21. The non-transitory computer-readable medium of claim 20 wherein the time period related to when the seed media content was on the at least one media popularity chart substantially corresponds to a range of dates during which the seed media content was on the at least one media popularity chart.

22. The non-transitory computer-readable medium of claim 20 wherein the time period related to when the seed media content was on the at least one media popularity chart includes a date that the seed media content first entered the at least one media popularity chart.

23. The non-transitory computer-readable medium of claim 20 wherein the time period related to when the seed media content was on the at least one media popularity chart includes a date that the seed media content reached a peak position on the at least one media popularity chart.

24. The non-transitory computer-readable medium of claim 20 wherein the time period related to when the seed media content was on the at least one media popularity chart includes a date that the seed media content exited the at least one media popularity chart.

25. A physical server comprising:
   a communication interface communicative coupling the physical server to a user device via a network; and
   a control system associated with the communication interface and adapted to:
      receive information identifying seed media content;
      obtain historical information regarding the seed media content;
      determine a time window for the seed media content based on the historical information;
      query a video database based on the time window to identify songs associated with videos historically related to the seed media content; and
      recommend at least a subset of the songs associated with the videos historically related to the seed media content to a user.

26. The physical server of claim 25, wherein the control system is further adapted to:
   identify other videos related to the videos historically related to the seed media content;
   identify songs associated with the other videos; and
   recommend at least a subset of the songs associated with the other videos to the user.

27. The physical server of claim 26 wherein in order to identify the other videos, the control system is further adapted to identify videos having at least one of a group consisting of: an actor, an actress, a director, and a producer in common with the videos historically related to the seed media content.

28. The physical server of claim 25 wherein the seed media content is one of a group consisting of: a seed song, a seed music album, a seed television program, and a seed movie.

29. The physical server of claim 25 wherein the information identifying the seed media content comprises metadata describing the seed media content.

30. The physical server of claim 25 wherein the video database is a television program database.

31. The physical server of claim 25 wherein the video database is a movie database.

32. The physical server of claim 25 wherein the time window for the seed media content is a time period related to when the seed media content was on at least one media popularity chart.

33. The physical server of claim 32 wherein the time period related to when the seed media content was on the at least one media popularity chart substantially corresponds to a range of dates during which the seed media content was on the at least one media popularity chart.

34. The physical server of claim 32 wherein the time period related to when the seed media content was on the at least one media popularity chart includes a date that the seed media content first entered the at least one media popularity chart.

35. The physical server of claim 32 wherein the time period related to when the seed media content was on the at least one media popularity chart includes a date that the seed media content reached a peak position on the at least one media popularity chart.

36. The physical server of claim 32 wherein the time period related to when the seed media content was on the at least one media popularity chart includes a date that the seed media content exited the at least one media popularity chart.

* * * * *